Patented Nov. 10, 1936

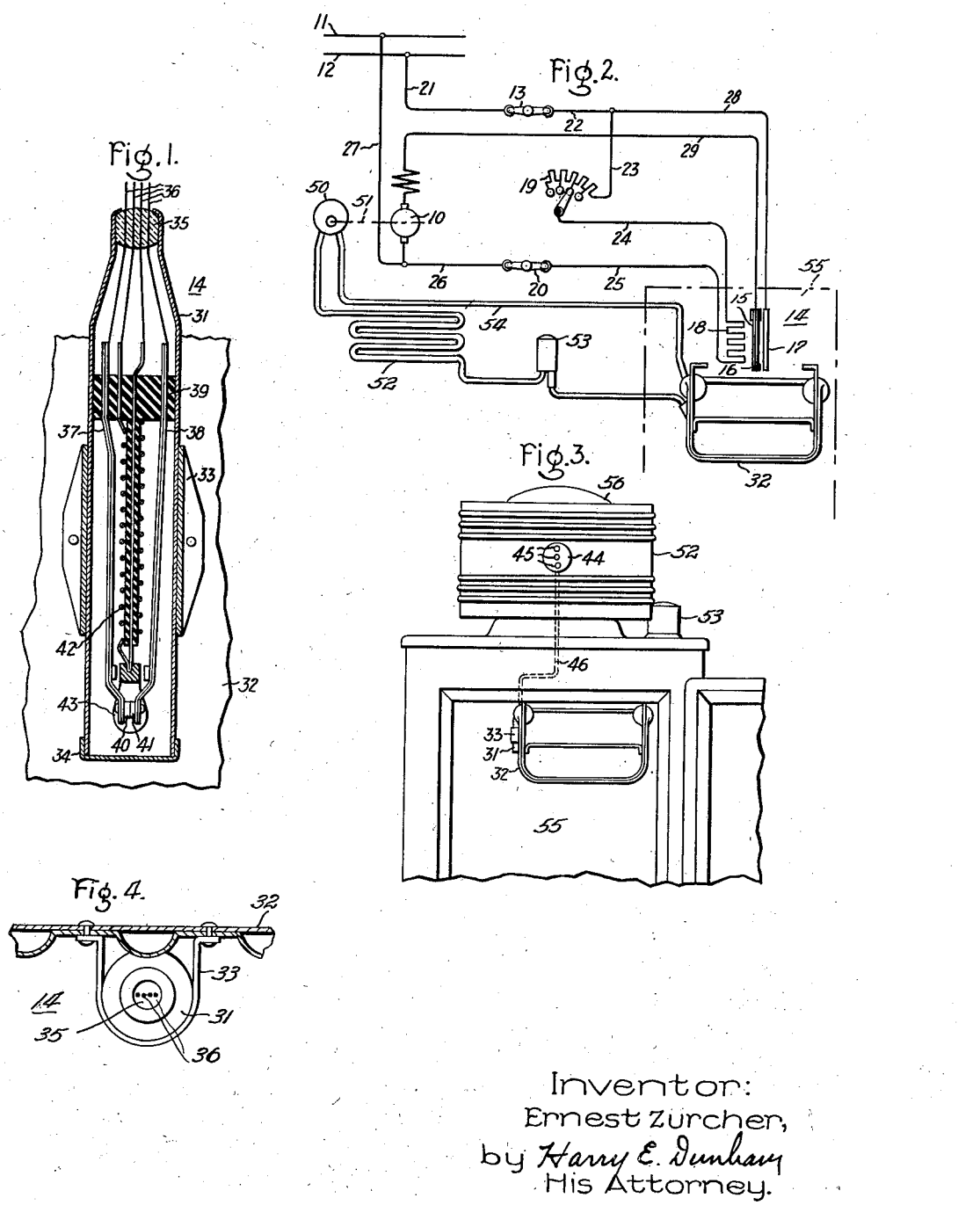

2,060,774

UNITED STATES PATENT OFFICE 2,060,774

CONTROL MEANS FOR REFRIGERATION SYSTEMS

Ernest Zurcher, Schenectady, N. Y., assignor to General Electric Company, a corporation of New York Application July 24, 1935, Serial No. 32,891

17 Claims. (Cl. 62—4)

My invention relates to refrigeration systems, more particularly to control means for varying the temperature produced by a refrigeration system, and has for an object the provision of simple, reliable and inexpensive control means of this character.

It has heretofore been proposed to provide refrigeration systems with adjustable means for controlling the cyclic operation of the refrigerating machine so as to produce any one of a plurality of desired temperatures, one adjustment of the control means providing for a cyclic operation in which the refrigerating machine is started at a temperature above 32 degrees so as to accomplish defrosting of the evaporator or cooling unit. Insofar as I am aware, however, all such control devices have been provided with a plurality of cams, springs and levers for adjusting the operation of the control means so as to start and stop the refrigerating machine at different predetermined high and low temperatures respectively.

Much is yet to be desired in the simplification of such mechanical adjusting means, and it is a further object of my invention to provide control means for a refrigerating system which is entirely electrical, which is simple and reliable and which is adjustable to vary the operation of the refrigerating machine so as selectively to provide any one of a plurality of refrigerating temperatures or to provide cyclic defrosting.

In carrying out my invention in one form, I provide in connection with a refrigerating machine, a thermal responsive element arranged to be influenced by the temperatures produced by the machine to start and stop the machine at predetermined high and low temperatures respectively. Thermally associated with the thermal element, I provide heating means for modifying the influence on the thermal element of the temperatures produced by the refrigerating machine. Means are also provided for selectively controlling the heating means to effect starting and stopping of the machine at any one of a plurality of different high and low temperatures whereby the mean average temperature produced by the refrigerating machine is varied at will.

More specifically, the thermal element is enclosed in a sealed casing of heat conducting material, and the casing is secured in heat exchanging relation with the evaporator or cooling unit of the refrigerating system so that the ambient temperature within the casing is directly influenced by the evaporator temperature. The thermal element is arranged to control the starting and stopping of the refrigerating machine in response to changes in the ambient temperature within the casing, and an electric heating unit is arranged within the casing to influence the ambient temperature jointly with the evaporator. A variable resistor is connected in the energizing circuit of the heating unit for controlling the influence exerted by the heating unit on the ambient temperature so as to effect starting and stopping of the refrigerating machine at any one of a plurality of predetermined high and low evaporator temperatures respectively. Means are also provided for deenergizing the heating unit to effect starting of the refrigerating machine at a defrosting evaporator temperature.

For a more complete understanding of my invention, reference should now be had to the drawing in which Fig. 1 is a sectional, elevational view of a preferred form of thermal control device for use in connection with control means embodying my invention; Fig. 2 is a diagrammatic representation of a refrigerating system provided with control means embodying my invention applied to a refrigerating machine; Fig. 3 is a fragmentary view of an electric refrigerator provided with my improved control means and Fig. 4 is a plan view of the device shown in Fig. 1, the evaporator, or cooling unit, being shown in cross-section.

Referring first to Fig. 2 of the drawing, I have shown my invention in one form as embodied in a refrigerating system including control means for effecting intermittent operation of a refrigerating machine by starting and stopping the compressor motor of the machine when the temperature produced by the refrigerating machine attains predetermined high and low values respectively. For purposes of illustration I have shown somewhat diagrammatically a refrigerating machine which includes a compressor 50 arranged to be driven by a compressor motor 10, the motor shaft being indicated by a broken line 51. The compressor 50 is arranged to supply liquid refrigerant to an evaporator, or cooling element, 32 through a suitable condenser 52 and a float chamber 53, and to withdraw gaseous refrigerant from the evaporator through a conduit 54. As shown, the evaporator is arranged within a suitable refrigerating chamber 55, indicated in Fig. 2 by a broken line. The compressor motor 10 is connected for energization from suitable supply lines 11 and 12 in series circuit relation with a manually operable switch 13 and a thermal control device 14. The thermal control device 14 comprises a bimetallic thermal element 15, the free end of which carries a contact 16 engageable with a cooperating contact member 17.

In accordance with my invention, the thermal element 15 is arranged within the chamber 55 so that the ambient temperature adjacent the thermal element 15 is influenced by the temperatures produced by the cooling element of the refrigerating machine, the thermal element being arranged to complete the circuit through the contacts 16 and 17 at a predetermined high ambient temperature, and to open the circuit at a predetermined low ambient temperature. Arranged adjacent the thermal element 15, I provide an electric heating unit 18 for influencing the ambient temperature jointly with the temperature produced in the chamber 55 by the refrigerating machine. As shown, the heating unit 18 is connected in series circuit relation with a variable resistor 19 and a manually operable switch 20.

It will be understood, of course, that the manually operable switch 13 is provided in order that the refrigerating machine may be stopped and started manually, the thermal control device 14 being arranged to provide intermittent cycling operation of the refrigerating machine when the manual control switch 13 is closed. In the drawing, the various elements of the control means are shown in their respective positions corresponding to a relatively low value of refrigerator temperature, the resistor 18 being energized and the refrigerator motor 10 being deenergized, due to the open circuit relation of the contacts 16 and 17. The energizing circuit for the heating unit 18 may be traced from the supply line 12 by way of the conductor 21, the switch 13, the conductors 22 and 23, a portion of the variable resistor 19, the conductor 24, the heating unit 18, the conductor 25, the switch 20 and the conductors 26 and 27 to the other supply line 11.

Since the compressor motor 10 is deenergized, it will be understood that the refrigerator temperature will gradually rise until the ambient temperature adjacent the thermal element 15, which ambient temperature is jointly influenced by the heating unit 18 and the refrigerator temperature, attains a value of sufficient magnitude to cause the thermal element 15 to flex sufficiently to close the circuit through the contacts 16 and 17. Closure of the contacts 16 and 17 energizes the motor and consequently, the refrigerating machine begins to operate so that the temperature produced thereby is gradually reduced. The energizing circuit of the compressor motor 10 may be traced from the supply line 12 through the conductor 21, the switch 13, the conductors 22 and 28, the contacts 17 and 16, the thermal element 15, the conductor 29, the field and armature windings of the motor 10, and by way of the conductors 30 and 27 to the other supply line 11. The refrigerating machine now continues to operate until the combined influence of the heater 18 and the temperature produced by the refrigerating machine provides an ambient temperature adjacent the thermal element 15 which is sufficient to operate the thermal element to open the circuit through the contacts 16 and 17. Consequent to the opening of the contacts 16 and 17, the compressor motor 10 is deenergized, and the temperature produced by the refrigerating machine thereupon begins to rise as described above. It will be apparent that the control device 14 is effective in this manner to accomplish an intermittent cycling operation of the refrigerating machine by starting and stopping the motor at predetermined high and low values respectively so as to produce a desired mean average temperature.

In some cases, it may be desired to provide a somewhat lower mean average temperature for quick freezing purposes, and accordingly, I provide means for controlling the operation of the control device 14. This modified operation of the refrigerating machine may be accomplished simply by turning the operating arm of the variable resistor 19 in a clockwise direction from the position shown so as to exclude a portion of the resistor 19 from the energizing circuit of the heater 18. The consequent increase in the energization of the heater 18 tends to raise the ambient temperature adjacent the thermal element 15, and accordingly, it will be apparent that the temperature produced by the refrigerating machine must attain a somewhat lower value in order to decrease the ambient temperature adjacent the thermal element to a value at which the contacts 16 and 17 will be opened. Likewise, the contacts 16 and 17 will close at a somewhat lower temperature than formerly, and accordingly, the thermal control device 14 is effective to provide intermittent cycling operation of the refrigerating machine between other predetermined high and low values respectively so as to provide a lower mean average temperature.

Similarly, the mean average temperature maintained by the control device 14 may be raised by operating the variable resistor 19 in a counterclockwise direction so as to include a larger portion of the resistor 19 in the energizing circuit of the heating unit.

As is well known in the art, the temperatures ordinarily maintained by a refrigerating machine are of such a value that frost accumulates on the evaporator or the cooling unit of the system, and it is desirable in some instances that the cooling unit be free from frost. Accordingly, I provide means for intermittently cycling the refrigerating machine between such high and low values of temperature as to accomplish defrosting of the cooling unit during each cycle, while maintaining a mean average temperature that is sufficient for refrigerating purposes. Defrosting of the cooling unit may be accomplished in accordance with my invention simply by operating the control switch 20 to interrupt the energizing circuit of the heating unit 18. With the heating unit 18 deenergized, it will be apparent that the temperature produced by the refrigerating machine must reach a relatively high value before the ambient temperature adjacent the thermal element 15 will reach a sufficiently high value to cause closure of the energizing circuit for the compressor motor 10. In accordance with my invention, this relatively high value of the temperature produced by the refrigerating machine will be above 32 degrees, and accordingly, defrosting of the evaporator will be accomplished.

In Fig. 1, I have shown a preferred form of the thermal control device 14 shown somewhat diagrammatically in Fig. 2. As shown in Fig. 1, the thermal control device 14 comprises a tubular casing 31 formed of suitable heat conducting material, which casing is secured directly to one wall of the refrigerator cooling unit 32 by means of a strap 33. As shown in Fig. 4, the casing 31 directly engages a wall of the evaporator 32 so as to provide for the direct flow of heat between the evaporator 32 and the casing 31. Preferably the casing 31 is indented, as shown, and directly engages one of the refrigerant passages of the evaporator. In Figs. 1 and 4, only a portion of the cooling unit or evaporator is shown. One end of the casing 31 is provided with a cap 34 for air-tightly sealing the casing, and the other end of the casing is provided with an insulating plug 35 through which extend suitable lead wires 36. Within the casing, I provide a thermal responsive device comprising a pair of bimetallic elements 37 and 38 which are supported on an insulating block 39, the free ends of the bimetallic elements being provided with co-operating contacts 40 and 41 respectively. It will be observed that in this embodiment of my invention, the bimetallic element 38 and the contact 41 are substituted for the contact member 17 shown in Fig. 2 in order to provide a somewhat longer break between the contacts of the thermal device. Also supported within the casing on the insulating block 39, is an electric heating unit 42 for controlling the ambient temperature within the casing. It will be apparent that the thermal control device shown in Fig. 1 may be connected in place of the control device shown somewhat diagrammatically in Fig. 2 by connecting the outer pair of lead wires 36 to the conductors 28 and 29, and by connecting the inner pair of lead wires 36 to the conductors 24 and 25.

Since the contacts 40 and 41 of the thermal control device are connected in series circuit relation with the compressor motor 10, these contacts may be called upon to interrupt currents of considerable magnitude. Accordingly, I have provided a small, U-shaped permanent magnet 43 supported within the casing, as shown, with its pole pieces adjacent the contacts 40 and 41 so that the magnetic flux therebetween will assist in interrupting the circuit when the contacts 40 and 41 are separated. In some cases it may be found that the motor currents are too large to be successfully interrupted by the control device 14, in which case a separate magnetic relay may be provided for controlling the motor circuit, the contacts 40 and 41 of the control device being arranged to control the energization of the relay.

It will be apparent that the temperature differential between the high and low evaporator temperatures at which the control device 14 is operable to start and stop the refrigerating machine respectively is dependent to some extent upon the rate of heat flow between the bimetallic elements and the evaporator. Accordingly, this temperature differential may be controlled by providing an ambient medium within the casing 31 having the desired thermal conductivity.

As indicated somewhat diagrammatically in Fig. 3, the control switches 13 and 20 and the variable resistor 19 are preferably mounted in a suitable switch box 44 and provided with suitable control knobs 45. The switch box 44 may be mounted in any suitable position on the refrigerator, preferably on the condenser 52, which surrounds an hermetically sealed casing 56 within which the motor 10 and the compressor 50 are mounted, a multi-conductor cable 46 serving to connect the switches and the resistor to the thermal control device 14 which is mounted on the evaporator.

Although I have shown the defrosting switch 20 as being manually operable both to initiate and to terminate the defrosting operation, it will be apparent that suitable automatic means such, for example, as clock mechanism or temperature responsive means, may be provided for terminating the defrosting operation automatically after a predetermined number of cycles or for both initiating and terminating such operation.

While I have shown a particular embodiment of my invention, it will be understood, of course, that I do not wish to be limited thereto since many modifications may be made and I, therefore, contemplate by the appended claims to cover any such modifications as fall within the true spirit and scope of my invention.

What I claim as new and desire to secure by Letters Patent of the United States is:

1. In combination, a control device for a refrigerating machine comprising a thermal element responsive to the temperature produced by the refrigerating machine, means controlled by the thermal element for starting and stopping the operation of the refrigerating machine at predetermined high and low temperatures, means for heating said thermal element whereby the operation thereof in response to temperatures produced by the refrigerating machine is modified, and means for controlling said heating means to effect starting and stopping of the refrigerating machine at other predetermined high and low temperatures.

2. In combination, a control device for a refrigerating machine comprising a thermal element responsive to the temperature produced by the refrigerating machine, means controlled by the thermal element for starting and stopping the operation of the refrigerating machine at predetermined high and low temperatures, an electric heater thermally associated with said thermal element, and means for controlling the energization of said heater whereby the operation of said thermal element in response to refrigerator temperature is modified to effect starting and stopping of the refrigerating machine at other predetermined high and low temperatures.

3. In combination, a control device for a refrigerating machine comprising a thermal element responsive to the temperature produced by the refrigerating machine, means controlled by the thermal element for starting and stopping the operation of the refrigerating machine at predetermined high and low temperatures, an electric heater thermally associated with said thermal element, means for energizing said heater whereby the operation of said thermal element in response to temperatures produced by the refrigerating machine is modified, a variable resistor connected in the energizing circuit of said heater, manual means for varying said resistor to effect starting and stopping of the refrigerating machine selectively at a plurality of other high and low temperatures, and means for deenergizing said heater to effect starting and stopping of the refrigerating machine at predetermined maximum high and low temperatures.

4. In combination with a refrigerating machine having an evaporator, a control device comprising a thermal element arranged in heat exchanging relation with the evaporator, means controlled by said thermal element for effecting intermittent operation of said machine by starting and stopping said machine at predetermined high and low evaporator temperatures respectively, means for heating said thermal element whereby the operation thereof in response to variations in the evaporator temperature is modified, and means for controlling said heating means to effect intermittent operation of the machine between other predetermined high and low evaporator temperatures.

5. In combination with a refrigerating machine having an evaporator, a control device comprising a thermal element arranged in heat exchanging relation with the evaporator, means controlled by said thermal element for effecting intermittent operation of said machine by starting and stopping said machine at predetermined high and low evaporator temperatures respectively, and an electric heater thermally associated with said thermal element, and means for controlling the energization of said heater whereby the operation of said thermal element in response to variations in the evaporator temperature is modified to effect intermittent operation of the machine between other high and low temperatures.

6. In combintion with a refrigerating machine having an evaporator, a control device comprising a thermal element arranged in heat exchanging relation with the evaporator, means controlled by said thermal element for effecting intermittent operation of said machine by starting and stopping said machine at predetermined high and low evaporator temperatures respectively, an electric heater thermally associated with said thermal element, means for energizing said heater whereby the operation of said thermal element in response to variations in the evaporator temperature is modified, manual means for selectively controlling the energization of said heater to effect continuous intermittent operation of said machine between a plurality of other predetermined high and low evaporator temperatures, and additional means for controlling said heater to effect continuous intermittent operation between such predetermined high and low limits as to accomplish defrosting of the evaporator.

7. In combination with a refrigerating machine having an evaporator, a control device comprising a thermal element arranged in heat exchanging relation with the evaporator, means controlled by said thermal element for effecting intermittent operation of said machine by starting and stopping said machine at predetermined high and low evaporator temperatures respectively, an electric heater thermally associated with said thermal element, means for energizing said heater to modify the thermal effect of the evaporator on said thermal element, a variable resistor connected in the energizing circuit of said heater, manual means for varying said resistor to effect continuous intermittent operation of said machine between a plurality of selected high and low evaporator temperatures, and means for deenergizing said heater to effect continuous intermittent operation of the machine between such predetermined high and low temperature limits as to accomplish defrosting of the evaporator.

8. In combination with a refrigerating machine having an evaporator, a control device comprising walls of thermal conducting material arranged to form a casing, means mounting said casing in heat exchanging relation with said evaporator whereby the ambient temperature within said casing varies with the temperature of said evaporator, means responsive to the ambient temperature within said casing for starting and stopping the refrigerating machine at predetermined high and low evaporator temperatures, and heating means associated with said casing for controlling said ambient temperature jointly with said evaporator whereby said temperature responsive means is operated to start and stop said refrigerating machine at other predetermined high and low evaporator temperatures.

9. In combination with a refrigerating machine having an evaporator, a control device comprising walls of thermal conducting material arranged to form a casing, means mounting said casing in heat exchanging relation with said evaporator whereby the ambient temperature within said casing varies with the temperature of said evaporator, means responsive to the ambient temperature within said casing for starting and stopping the refrigerating machine at predetermined high and low evaporator temperatures, and means including an electric heater thermally associated with said casing for controlling said ambient temperature jointly with said evaporator whereby said temperature responsive means is operated to start and stop said refrigerating machine at other predetermined high and low evaporator temperatures.

10. In combination with a refrigerating machine having an evaporator, a control device comprising walls of thermal conducting material arranged to form a casing, means mounting said casing in heat exchanging relation with said evaporator whereby the ambient temperature within said casing varies with the temperature of said evaporator, means responsive to the ambient temperature within said casing for starting and stopping the refrigerating machine at predetermined high and low evaporator temperatures, an electric heater thermally associated with said casing, means for energizing said heater to control said ambient temperature jointly with said evaporator, and means for controlling the energization of said heater to effect operation of said temperature responsive means at other predetermined high and low evaporator temperatures.

11. In combination with a refrigerating machine having an evaporator, a control device comprising walls of thermal conducting material arranged to form a sealed casing, means mounting said casing in heat exchanging relation with said evaporator whereby the ambient temperature within said casing is influenced by the temperature of said evaporator, a thermal element within said casing responsive to the ambient temperature therein, means controlled by said thermal element for starting and stopping the refrigerating machine at predetermined high and low temperatures, and heating means within said casing for influencing said ambient temperature jointly with said evaporator whereby said thermal element is operated to start and stop said refrigerating machine at other predetermined high and low evaporator temperatures.

12. In combination with a refrigerating machine having an evaporator, a control device comprising walls of thermal conducting material arranged to form a sealed casing, means mounting said casing in heat exchanging relation with said evaporator whereby the ambient temperature within said casing is influenced by the temperature of said evaporator, a thermal element within said casing responsive to the ambient temperature therein, means controlled by said thermal element for starting and stopping the refrigerating machine at predetermined high and low temperatures, an electric heater within said casing, means for energizing said heater to influence said ambient temperature jointly with said evaporator and means for controlling the energization of said heater to effect operation of said thermal element at other predetermined high and low evaporator temperatures.

13. A refrigerating system comprising in combination an evaporator, a liquefying unit for supplying liquid refrigerant to and for withdrawing gaseous refrigerant from the evaporator, a control device comprising walls of thermal conducting material arranged to form a sealed casing, means mounting said casing in heat exchanging relation with said evaporator whereby the ambient temperature within said casing is influenced by the temperature of the evaporator, a thermal element within said casing responsive to the ambient temperature therein, means controlled by said thermal element for effecting an intermittent operation of said unit by starting and stopping said unit at predetermined high and low temperature limits respectively, an electric heater within said casing energizable to influence said ambient temperature jointly with said evaporator, means for selectively controlling the energization of said heater to effect continuous intermittent operation of said unit by starting and stopping said unit at other predetermined temperatures, and means for deenergizing said heater, said thermal element when said heater is deenergized being effective to start said unit at a frost melting evaporator temperature.

14. A refrigerating system comprising a cooling element, means for cooling said element, control means including a thermal element for controlling said cooling means to maintain a substantially constant average temperature in said cooling element, and means including a heating element for modifying the operation of said control means to maintain a different substantially constant average temperature.

15. A refrigerating system comprising a cooling element, means for supplying liquid refrigerant to and for withdrawing vaporized refrigerant from said cooling element, control means including a thermal element for controlling the supply of refrigerant to said cooling element to maintain a substantially constant average temperature, means including an electric heating element for modifying the operation of said thermal element, and means for controlling the energization of said heating element to maintain a different substantially constant average temperature.

16. A refrigerating system comprising a cooling element, means for supplying liquid refrigerant to and for withdrawing vaporized refrigerant from said cooling element, control means including a thermal element responsive to the temperature of said cooling element for controlling the supply of refrigerant to said cooling element to maintain a predetermined average temperature, means for heating said thermal element to modify the operation of said control means, and means for selectively controlling said heating means to maintain any one of a plurality of different average temperatures.

17. In combination with a refrigerating machine having an evaporator and means for supplying liquid refrigerant to and withdrawing vaporized refrigerant from said evaporator, control means including a thermal element for controlling the supply of refrigerant to maintain a predetermined average temperature, walls of thermal conducting material arranged to form a casing for said thermal element, means mounting said casing in heat exchanging relation with said evaporator whereby the ambient temperature within said casing varies with the temperature of said evaporator, and means including a heating element associated with said casing for controlling said ambient temperature jointly with said evaporator to vary the operation of said control means so as to maintain a different average temperature.

ERNEST ZURCHER.